(12) United States Patent
Kaizu et al.

(10) Patent No.: US 7,218,472 B2
(45) Date of Patent: May 15, 2007

(54) MAGNETIC RECORDING AND REPRODUCING APPARATUS AND CONTROL METHOD FOR THE SAME

(75) Inventors: Akimasa Kaizu, Tokyo (JP); Yoshikazu Soeno, Tokyo (JP); Makoto Moriya, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/213,799

(22) Filed: Aug. 30, 2005

(65) Prior Publication Data
US 2006/0209453 A1    Sep. 21, 2006

(30) Foreign Application Priority Data
Mar. 15, 2005   (JP)   ................................ 2005-73824

(51) Int. Cl.
*G11B 5/596*   (2006.01)
(52) U.S. Cl. .................................................. 360/77.02
(58) Field of Classification Search ...................... None
See application file for complete search history.

(56) References Cited

U.S. PATENT DOCUMENTS 5,815,333 A * 9/1998 Yamamoto et al. ........... 360/60
6,262,860 B1 * 7/2001 Ishida et al. ............. 360/78.05
6,510,015 B2 * 1/2003 Sacks et al. .................. 360/75
6,614,608 B1 * 9/2003 Belser et al. ................. 360/48
6,757,126 B1 * 6/2004 Kuroda et al. ........... 360/77.02
2003/0210491 A1   11/2003 Kuroda et al.

FOREIGN PATENT DOCUMENTS

JP        A 2003-232772        11/2003

* cited by examiner

*Primary Examiner*—K. Wong
(74) *Attorney, Agent, or Firm*—Oliff & Berridge, PLC

(57) ABSTRACT

A magnetic recording and reproducing apparatus includes: a magnetic recording medium onto which servo information including position information is recorded by a plurality of concavo-convex patterns formed by a magnetic layer; a gate circuit that extracts a part of a reproducing signal of the concavo-convex patterns by removing an end of a signal corresponding to a concave portion or a convex portion of the concavo-convex patterns from the reproducing signal; a first integrator that obtains area integral of an extracted reproducing signal; and a second integrator that adds respective signals after area integral is obtained to each other to generate a position control signal for controlling a position of a magnetic head. Thus, the magnetic recording and reproducing apparatus can make an output of the position control signal larger and can perform positioning control for the magnetic head with high precision.

4 Claims, 11 Drawing Sheets

Circumferential direction

Concavo-convex pattern

MAGNETIC RECORDING AND REPRODUCING APPARATUS AND CONTROL METHOD FOR THE SAME

BACKGROUND OF THE INVENTION

1. Field of the Invention

The present invention relates to a magnetic recording and reproducing apparatus including a magnetic recording medium such as a discrete track medium and a patterned medium, and a control method for that magnetic recording and reproducing apparatus.

2. Description of the Related Art

A magnetic recording and reproducing apparatus including a magnetic recording medium on which positioning information used for positioning control for a magnetic head is recorded has been conventionally known.

FIG. 16 shows an exemplary magnetic recording medium included in the conventionally known magnetic recording and reproducing apparatus.

The magnetic recording medium 100 shown in FIG. 16 has a plurality of servo region 102 radially formed at predetermined intervals. A concavo-convex pattern formed by a magnetic layer forms each servo region 102. Servo information is stored in the servo region 102. As shown in FIG. 17 that shows the servo region 102 in an enlarged state, the servo information includes a preamble portion 104, a servo mark portion 106, an address portion 108 in which address information is stored, and a burst portion 110 in which position information is stored. User data is to be recorded on data tracks 112 as shown in the same figure.

A burst pattern formed by four types of burst signal groups 110A, 110B, 110C, and 110D is formed as the position information in the burst portion 110 of the servo region 102. The burst signal groups 110A and 110B are arranged as a pair of position information in such a manner that they each symmetrically extend with respect to the center line of the corresponding data track 112. The burst signal groups 110C and 110D are arranged as another pair of position information at positions shifted from the burst signal groups 110A and 110B by a half of a track pitch, respectively.

FIG. 18 is an enlarged view of the burst signal group 110A. The other burst signal groups 110B, 110C, and 110D also have the same structure as that of the burst signal group 110A.

As shown in FIG. 18, the burst signal group 110A (110B, 110C, or 110D) is formed by a plurality of (about 10 to 30 in a typical case) concavo-convex patterns arranged in a circumferential direction. In the concavo-convex pattern, convex portions (black portions in FIG. 18) formed by a magnetic layer (magnetic material) have a length BL1 in the circumferential direction and a radial width BW1 in a radial direction, and concave portion have a length BL2 in the circumferential direction. In general, the magnetic recording and reproducing apparatus rotates the magnetic recording medium 100 at a constant angular velocity. Thus, the circumferential length BL1 of the convex portion and the circumferential length BL2 of the concave portion are varied depending on their positions in the radial direction on the magnetic recording medium 100, and they become longer from an inner circumferential side to an outer circumferential side of the magnetic recording medium 100.

The burst pattern in the burst portion 110 is formed by arranging each burst signal group (110A, 110B, 110C, or 110D) at a plurality of positions at an interval BW2 in the radial direction, as shown in FIG. 19.

A position control circuit 130 reproduces the above burst pattern. An exemplary position control circuit 130 is shown in FIG. 20. The position control circuit 130 includes: an amplifier 116 that amplifies a reproducing signal read by a magnetic head 114; a differentiator 118 that differentiates the reproducing signal; a zero-cross detector 120; a comparator 122 that generates a predetermined gate pulse signal; a peak detector 124 that detects a maximum output (peak output) of the reproducing signal so as to generate a position control signal; a sample hold unit 126 that holds the position control signal; and a differential amplifier 128. Thus, the position control circuit 130 is used for so-called peak detecting type position control.

The zero-cross detector 120 generates a predetermined signal during a period in which the level of the signal differentiated by the differentiator 118 is 0 (zero). For example, the zero-cross detector 120 generates the predetermined signal in the case where there is a maximum value (peak value) in the reproducing output read by the magnetic head 14.

The comparator 122 is arranged to output the gate pulse signal when the reproducing output is equal to or larger than a certain constant output. Since the zero-cross detector 120 generates the predetermined signal even when the reproducing output is zero, the comparator 122 removes an unwanted signal generated by the zero-cross detector 120 by using the gate pulse signal, performs A/D conversion for the amplified reproducing output, and stores the amplified reproducing output after A/D conversion.

After the burst pattern recorded on the magnetic recording medium 100 is read by the magnetic head 114, the reproducing signal of the burst pattern is amplified by the amplifier 116 and is then input to the differentiator 118 so as to differentiate the reproducing signal. The differentiated reproducing signal passes through the zero-cross detector 120 and is then input to the peak detector 124. The peak detector 124 detects a position at which both the gate pulse signal from the comparator 122 and the signal from the zero-cross detector 120 coexist. Then, the reproducing output from the amplifier 116 at the thus detected position is determined as the maximum output (peak output). The thus determined maximum output is output as a position control signal to the sample hold unit 126. The sample hold unit 126 holds the position control signals of the burst signal groups 110A, 110B, 110C, and 110D. The differential amplifier 128 obtains an output difference between the position control signals of the burst signal groups 110A and 110B or between the position control signals of the burst signal groups 110C and 110D, thereby acquiring position information of the magnetic head 114. In this manner, positioning (tracking) control for the magnetic head 114 is carried out (see Japanese Patent Laid-Open No. 2003-323772, for example).

However, in case of a magnetic recording medium such as a discrete track medium and a patterned medium, on which the burst pattern (position information) is recorded by the concavo-convex pattern formed by the magnetic layer, a magnetization signal of the concavo-convex pattern is recorded with unidirectional polarity. Thus, the reproducing signal of the concavo-convex pattern has a waveform shown in FIG. 21. In FIG. 21, black portions represent a plan view of the convex portions in the concavo-convex pattern. Please note that the reproducing signal waveform of the concavo-convex pattern in FIG. 21 is an example in the case where the magnetic layer is a perpendicular magnetic recording layer.

In that magnetic recording medium in which the burst pattern is recorded by the concavo-convex pattern formed by the magnetic layer, the output level of the position control signal used for positioning control for the magnetic head is about half, as compared with a conventional continuous-layer medium in which a magnetization signal of a concavo-convex pattern is recorded with bidirectional polarity. Thus, improvement of the position control for the magnetic head has a limitation.

SUMMARY OF THE INVENTION

In view of the foregoing problems, various exemplary embodiments of this invention provide a magnetic recording and reproducing apparatus and a control method for the same, which can make an output of a position control signal larger and can perform positioning control for a magnetic head with high precision.

The inventor of the present invention found the magnetic recording and reproducing apparatus and the control method for the same that can make the output of the position control signal larger and can perform positioning control for the magnetic head with high precision.

(1) A magnetic recording and reproducing apparatus comprising:

a magnetic recording medium onto which servo information including position information is recorded by a plurality of concavo-convex patterns formed by a magnetic layer;

extraction devices for extracting a part of a reproducing signal of the concavo-convex patterns by removing an end of a signal corresponding to a concave portion or a convex portion of the concavo-convex patterns from the reproducing signal;

integral devices for obtaining area integral of an extracted reproducing signal; and signal addition devices for adding respective signals after area integral is obtained to each other to generate a position control signal for controlling a position of a magnetic head.

(2) The magnetic recording and reproducing apparatus according to (1), wherein the extraction devices generates a gate pulse signal having a pulse width smaller than a pulse width of the signal corresponding to the concave portion or the convex portion, and extracts the part of the reproducing signal by using the gate pulse signal.

(3) A control method for a magnetic recording and reproducing apparatus, comprising:

extracting a part of a reproducing signal of concavo-convex patterns that form position information recorded on a magnetic recording medium by removing an end of a signal corresponding to a concave portion or a convex portion of the concavo-convex patterns from the reproducing signal, the concavo-convex patterns being formed by a magnetic layer;

obtaining area integral of an extracted reproducing signal;

adding respective signals after area integral is obtained to each other to generate a position control signal; and performing positioning control for a magnetic head based on the position control signal.

(4) The control method according to (3), further comprising:

generating a gate pulse signal having a pulse width smaller than a pulse width of the signal corresponding to the concave portion or the convex portion; and extracting the part of the reproducing signal by using the gate pulse signal.

The term "position information" in the present invention shall refer to information used for positioning (tracking) control for a magnetic head. In general, a burst pattern recorded on aburst portion of a servo region corresponds to the "position information."

The term "reproducing signal of concavo-convex pattern" in the present invention shall refer to a signal output when a magnetization signal of the concavo-convex pattern is reproduced by means of the magnetic head, as well as a signal obtained by amplifying that signal.

The magnetic recording and reproducing apparatus and the control method for the same of the present invention have excellent effects that the output of the position control signal can be made larger and the positioning control for the magnetic head can be performed with high precision.

DETAILED DESCRIPTION OF THE PREFERRED EMBODIMENTS

A magnetic recording and reproducing apparatus and a control method for the same according to a first exemplary embodiment of the present invention will now be described with reference to the drawings.

Figure 1:
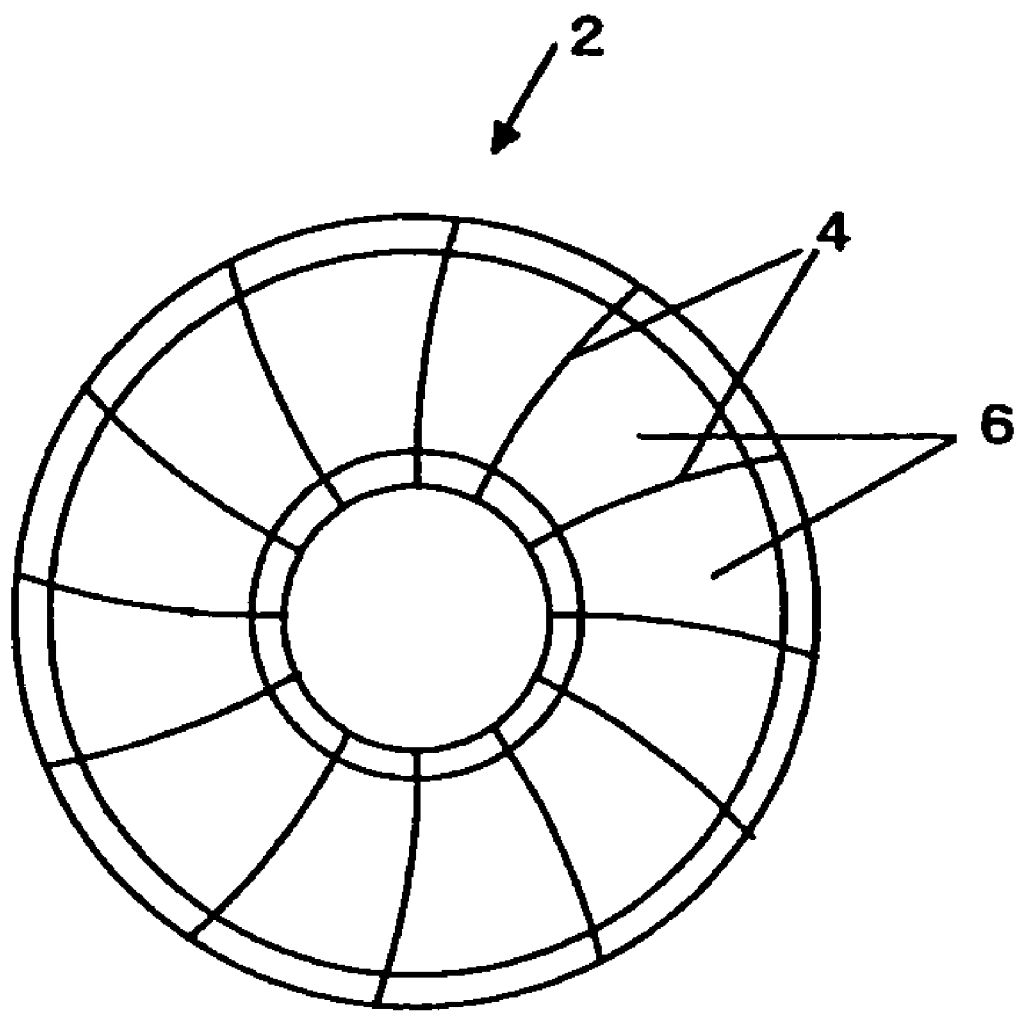
FIG. 1 is a plan view schematically showing a magnetic recording medium in a magnetic recording and reproducing apparatus according to a first exemplary embodiment of the present invention.

The magnetic recording and reproducing apparatus (not shown) of the first exemplary embodiment includes a magnetic recording medium 2 having a disk-like shape, as shown in FIG. 1. A plurality of servo region 4 and a plurality of user data region 6 are alternately arranged in a circumferential direction on the magnetic recording medium 2.

Figure 2:
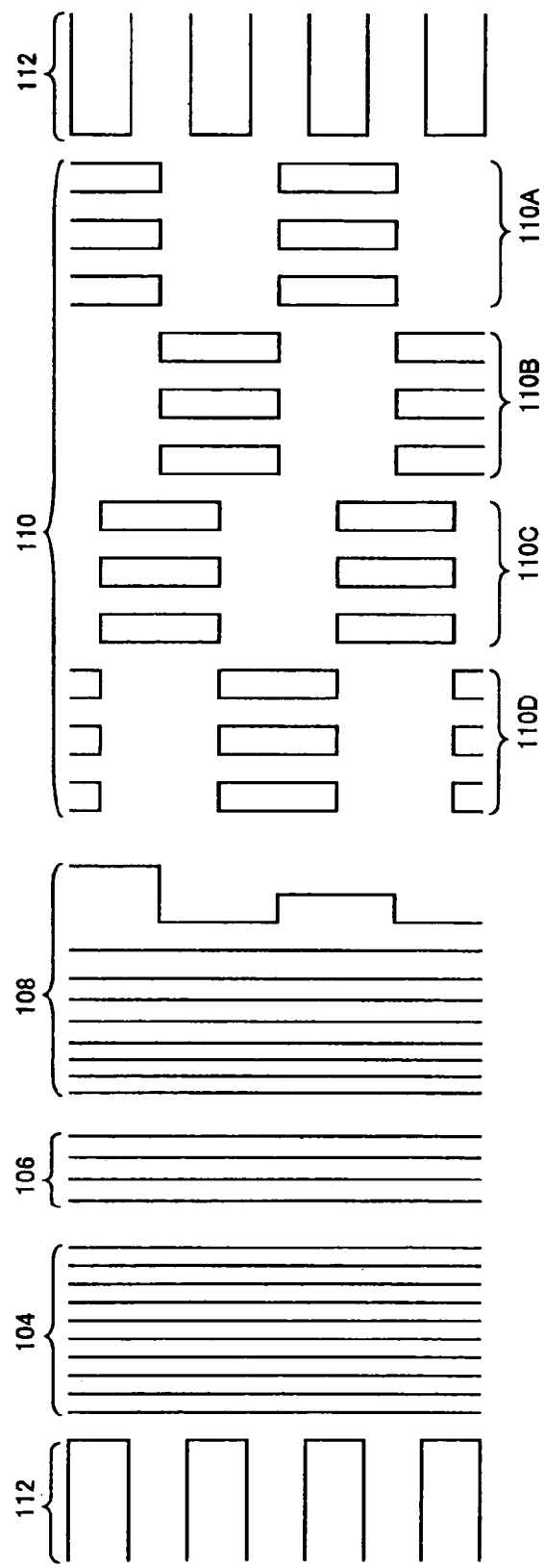
FIG. 2 is an enlarged view schematically showing a portion around a servo region on the magnetic recording medium of the magnetic recording and reproducing apparatus according to the first exemplary embodiment of the present invention.

Servo information is stored in the servo region 4. As shown in FIG. 2, the servo information includes a preamble portion 104, a servo mark portion 106, an address portion 108 in which address information is stored, and a burst portion 110 in which position information is stored. A burst pattern (position information) that is formed by arranging each burst signal group 110A (110B, 110C, or 110D) at a plurality of positions in a radial direction is formed in the burst portion 110. User data is to be stored in data tracks 112 as shown in the figure.

Figure 3:
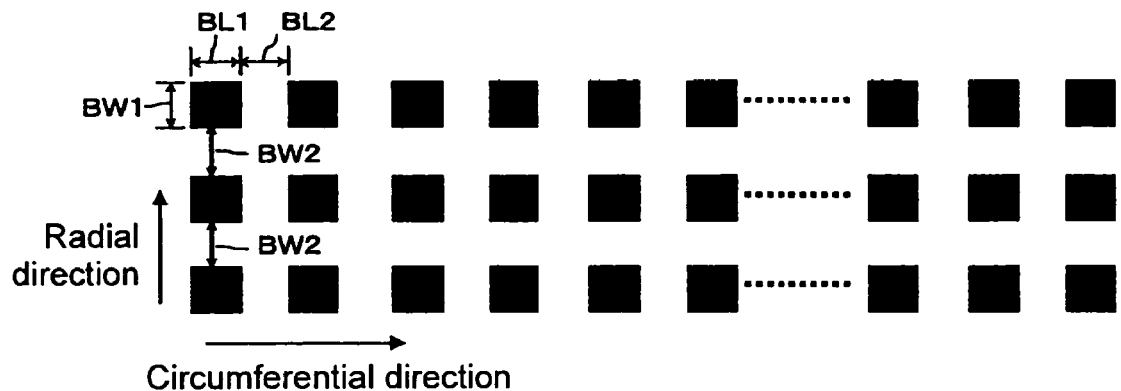
FIG. 3 is an enlarged view schematically showing a part of a burst pattern in the servo region on the magnetic recording medium of the magnetic recording and reproducing apparatus according to the first exemplary embodiment of the present invention.
Figure 19:
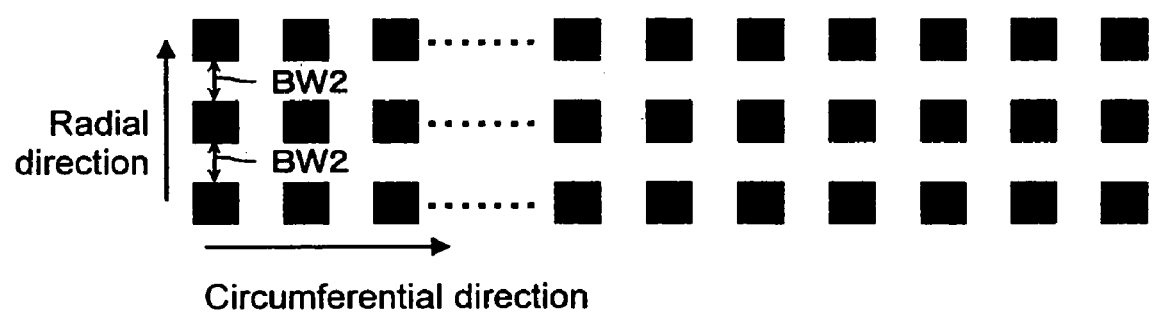
FIG. 19 is an enlarged view schematically showing a part of a burst pattern in the servo region on the magnetic recording medium of the conventional magnetic recording and reproducing apparatus.

FIG. 3 is a view showing a part of the burst pattern (one type of burst signal group in this exemplary embodiment) formed in the servo region 4 of the magnetic recording medium 2, and corresponds to FIG. 19 described above.

As shown in FIG. 3, the burst pattern in which a plurality of burst signal group 110A (110B, 110C, or 110D) are arranged in the radial direction is formed in the servo region 4, as in the conventional magnetic recording medium 100.

Figure 4:
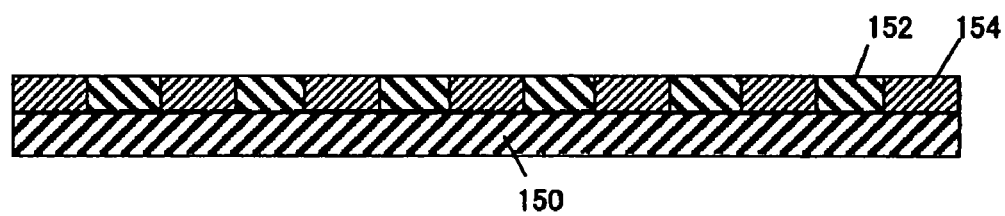
FIG. 4 is a cross-sectional side view schematically showing an exemplary magnetic recording medium of the magnetic recording and reproducing apparatus according to the first exemplary embodiment of the present invention.

A structure of a concavo-convex pattern in the burst pattern of the magnetic recording medium 2 and arrangement of burst signal groups are the same as those of the aforementioned conventional magnetic recording medium 100. For example, the concavo-convex pattern can be formed by providing convex portions 152 formed by a magnetic layer on a substrate 150 that is formed by a glass substrate, an underlayer, a soft magnetic layer, a seed layer, and the like, as shown in FIG. 4. Concave portions 154 may be filled with a filling material formed of $SiO_2$.

On the other hand, a plurality of recording tracks arranged in an approximately concentric pattern are formed in the user data region 6. The recording track is formed by convex portions of a concavo-convex pattern. The recording tracks are magnetically separated from each other by a plurality of grooves concentrically formed by concave portions of the concavo-convex pattern. User data is stored as magnetization information in the user data region 6.

The burst pattern on the magnetic recording medium 2 is reproduced by means of the magnetic recording and reproducing apparatus as described below.

Figure 5:
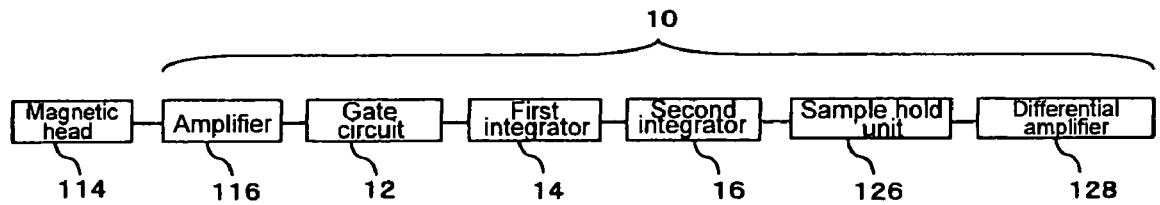
FIG. 5 is a block diagram of a position control circuit of the magnetic recording and reproducing apparatus according to the first exemplary embodiment of the present invention.
Figure 20:
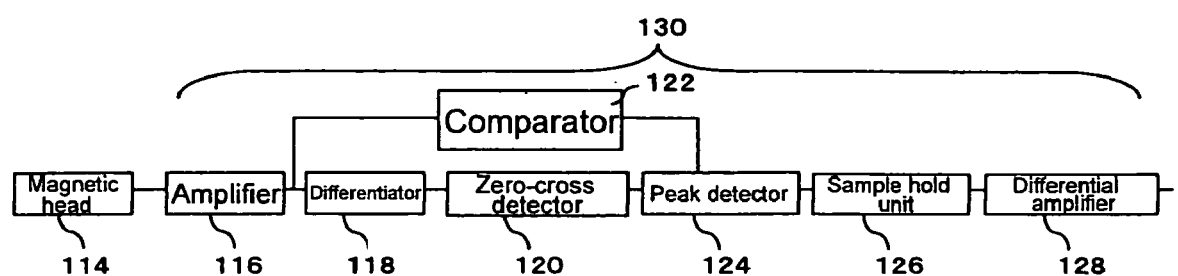
FIG. 20 is a block diagram of a position control circuit of the conventional magnetic recording and reproducing apparatus.
Figure 21:
FIG. 21 is a view showing a plane of a concavo-convex pattern on the magnetic recoding medium and a reproducing signal of the concavo-convex pattern in the conventional magnetic recording and reproducing apparatus.
Figure 21:

FIG. 5 is a block diagram of a position control circuit 10 of the magnetic recording and reproducing apparatus (not shown) of the first exemplary embodiment, and corresponds to the conventional position control circuit 130 shown in FIG. 20 described above. Except for the position control circuit 10, the structure of the magnetic recording and reproducing apparatus of the first exemplary embodiment is the same as that of the aforementioned conventional recording and reproducing apparatus. Therefore, the same components are labeled with the same reference numerals in the drawings and description of those components is omitted.

The position control circuit 10 that is one of features of the present invention will now be described in detail.

As shown in FIG. 5, the position control circuit 10 includes: an amplifier 116; a gate circuit (extraction devices) 12 that extracts a part of a reproducing signal of a concavo-convex pattern by removing an end of a signal corresponding to a convex portion or a concave portion of the concavo-convex pattern from the reproducing signal; a first integrator (integral devices) 14 that obtains area integral of each signal extracted by the gate circuit 12; a second integrator (signal addition devices) 16 that adds respective signals for which area integral is obtained by the first integrator 14 to each other so as to generate a position control signal for controlling a position of a magnetic head; a sample hold unit 126; and a differential amplifier 128.

Figure 6:
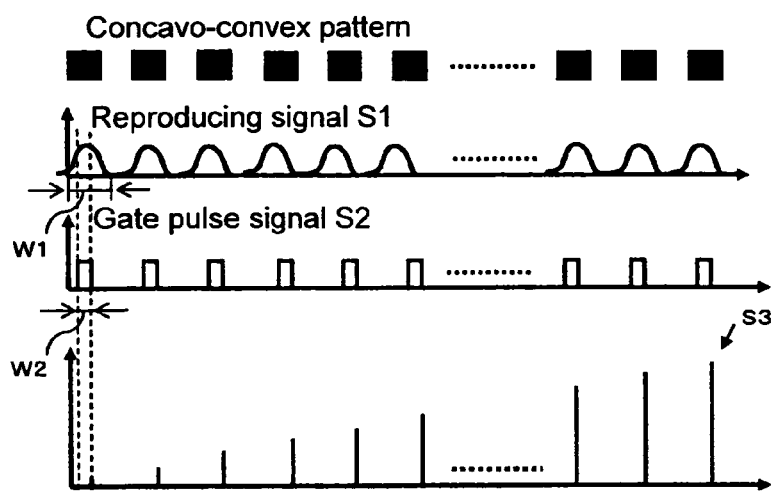
FIG. 6 includes a schematic plan view showing a concavo-convex pattern, a graph showing a reproducing signal of the concavo-convex pattern, a graph showing a gate pulse signal, and a graph showing a position control signal in the magnetic recording medium of the magnetic recording and reproducing apparatus according to the first exemplary embodiment of the present invention.

The gate circuit 12 detects a servo mark indicating a start position of the burst pattern and generates a gate pulse signal S2 having a predetermined period, as shown in FIG. 6, by using the servo mark as a reference. FIG. 6 schematically shows a plan view of the concavo-convex pattern on the magnetic recording medium 2 of the magnetic recording and reproducing apparatus of the first exemplary embodiment, and graphs showing the reproducing signal S1 of the concavo-convex pattern, the gate pulse signal S2, and the position control signal S3.

A pulse width W2 of the gate pulse signal S2 in a high-level period is set to be smaller than a pulse width W1 of the signal corresponding to the convex portion of the concavo-convex pattern. The gate pulse signal S2 is used for removing the end of the signal corresponding to the convex portion from the reproducing signal S1 of the concavo-convex pattern so as to extract a part of the reproducing signal S1. The pulse width of the signal corresponding to the convex portion (or the concave portion) shall refer to a value obtained by dividing "a circumferential length of the convex portion (or the concave portion)" by "a circumferential velocity of a magnetic recording medium."

An operation of the magnetic recording and reproducing apparatus of the first exemplary embodiment will now be described.

A reproducing signal S1 of position information read by the magnetic head 114 is amplified by the amplifier 116 and is then input to the first integrator 14 through the gate circuit 12. The first integrator 14 obtains area integral of the thus input reproducing signal S1 only during a period in which a gate pulse signal S2 generated by the gate circuit 12 is output. Respective signals obtained as a result of area integral are sequentially added by the second integrator 16. The result of addition by the second integrator 16 is output as a position control signal S3 to the sample hold unit 126. The sample hold unit 126 holds the position control signals S3 of the burst signal groups 110A, 110B, 110C, and 110D. The differential amplifier 128 obtains an output difference between the position control signals S3 of the burst signal groups 110A and 110B or between the position control signals S3 of the burst signal groups 110C and 110D, thereby acquiring information on the position of the magnetic head 114. In this manner, positioning (tracking) control for the magnetic head 114 is performed.

According to the first exemplary embodiment, a magnetic recording and reproducing apparatus includes: a magnetic recording medium 2 onto which servo information including position information is recorded by a plurality of concavo-convex patterns formed by a magnetic layer; extraction devices (the gate circuit 12 in the first exemplary embodiment) that extracts a part of a reproducing signal S1 of the concavo-convex patterns by removing an end of a signal corresponding to a concave portion or a convex portion of the concavo-convex patterns (the signal corresponding to the convex portion in the first exemplary embodiment) from the reproducing signal S1; integral devices (the first integrator 14 in the first exemplary embodiment) that obtains area integral of an extracted reproducing signal; and signal addition devices (the second integrator 16 in the first exemplary embodiment) that adds respective signals obtained as a result of area integral to each other so as to generate the position control signal used for controlling the magnetic head 114. Therefore, the output of the position control signal can be made larger and positioning control can be performed with high precision. Moreover, it is possible to remove a noise in the reproducing signal caused by variation in a shape and arrangement of the concavo-convex patterns by means of the extraction devices. Thus, the position control signal can be made stable.

In addition, according to the first exemplary embodiment, a control method for a magnetic recording and reproducing apparatus includes: extracting a part of a reproducing signal S1 of concavo-convex patterns that form position information recorded on a magnetic recording medium by removing an end of a signal corresponding to a concave portion or a convex portion in the concavo-convex patterns, the concavo-convex patterns being formed by a magnetic layer; obtaining area integral of an extracted reproducing signal; adding respective signals obtained as a result of area integral to generate a position control signal; and performing positioning control for a magnetic head based on the position control signal. Thus, it is possible to make the output of the position control signal larger and perform positioning control with high precision. Moreover, the noise in the reproducing signal caused by variation in the shape and arrangement of the concavo-convex patterns can be removed. Thus, the position control signal can be made stable.

Furthermore, the extraction devices generates a gate pulse signal having a pulse width smaller than a pulse width of the signal corresponding to the concave portion or the convex portion (the signal corresponding to the convex portion in the first exemplary embodiment) and extracts the part of the reproducing signal by using the gate pulse signal. Thus, the noise in the reproducing signal can be easily removed by the apparatus with a simple structure.

The inventor of the present invention measured the output of the position control signal for each of the magnetic recording and reproducing apparatus of the first exemplary embodiment and the conventional magnetic recording and reproducing apparatus.

In the measurement, the circumferential length BL1 of the convex portion, the circumferential length BL2 of the concave portion, the radial width BW1 of the convex portion, and the radial width BW2 of the concave portion in the burst pattern were set to 200 nm. Please note that the above values of the circumferential lengths of the convex portion and the concave portion were values obtained on a 2.5-inch disk at 20-mm positions from a disk center in the radial direction. Moreover, the track pitch of the data tracks was set to 200 nm (127 kTPI) and the width of the data track was set to 120 nm.

A perpendicular magnetic recording layer having a thickness of 15 nm was formed as the recording layer. This perpendicular magnetic recording layer formed the convex portions of the burst pattern, and was magnetized to generate a magnetic field of a servo signal. More specifically, magnetic poles of an electromagnet that generates a direct-current field of $1.2 \times 10^6$ A/m were arranged in such a manner that a disk surface was parallel to surfaces of the magnetic poles. Then, servo information was recorded by providing magnetization to the perpendicular magnetic recording layer in the servo region in block. When the magnetic characteristics of the perpendicular magnetic recording layer were measured by means of a vibrating sample magnetometer (VSM), saturated magnetization Bs and residual saturated magnetization Br were 0.44 T and 0.43 T, respectively.

While the magnetic recording medium having the above structure was rotated at 4200 rpm, the magnetic head was flown above a position corresponding to 20 mm in radius on the 2.5-inch disk at a height of 11 nm. In this state, a signal was recorded onto the data track by the magnetic head having a writing width of 200 nm. Then, the burst pattern was reproduced by a GMR magnetic head having a reading width of 120 nm and the output of the position control signal was measured for each of the magnetic recording and reproducing apparatus of the first exemplary embodiment and the conventional magnetic recording and reproducing apparatus.

Figure 7:
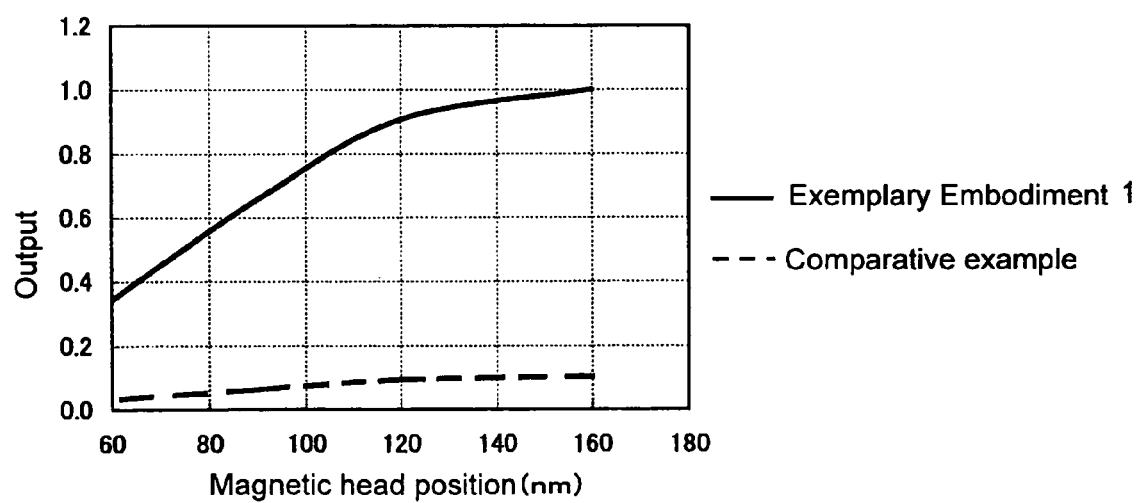
FIG. 7 is a graph showing a relationship between a magnetic head position and an output of the position control signal in the magnetic recording and reproducing apparatus according to the first exemplary embodiment of the present invention.
Figure 8:
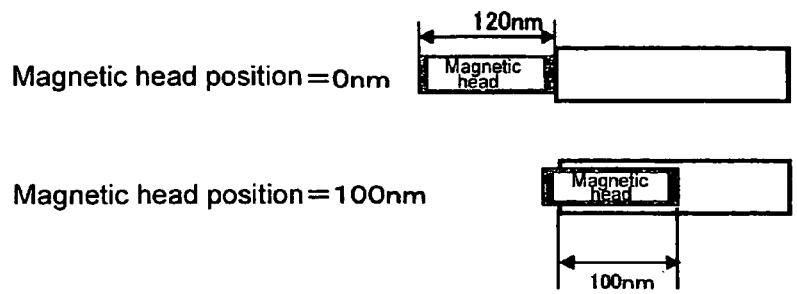
FIG. 8 is a view explaining a definition of the magnetic head position in FIGS. 7 and 9.

The measurement results are shown in FIG. 7. FIG. 7 is a graph showing a relationship between the magnetic head position and the output of the position control signal of the burst signal group 110A. In FIG. 7, the solid line represents the output of the magnetic recording and reproducing apparatus of the first exemplary embodiment and the broken line represents the output of the conventional magnetic recording and reproducing apparatus. The magnetic head position in the horizontal axis is a distance between the left end of the burst signal group 110A and the right end of the magnetic head, as shown in FIG. 8. Moreover, a value of the output in the vertical axis was a value obtained by normalization in which the output value of the magnetic recording and reproducing apparatus of the first exemplary embodiment when the magnetic head was located at a 160-nm position was regarded as 1.

As shown in FIG. 7, as for the magnetic recording and reproducing apparatus of the first exemplary embodiment, the output of the position control signal was larger throughout a range in which data was obtained (i.e., a range of the magnetic head position from 60 to 160 nm), as compared with the conventional magnetic recording and reproducing apparatus shown as a comparative example.

The inventor of the present invention further measured a position error signal (PES) with respect to the magnetic head position for each of the magnetic recording and reproducing apparatus of the first exemplary embodiment and the conventional magnetic recording and reproducing apparatus.

Figure 9:
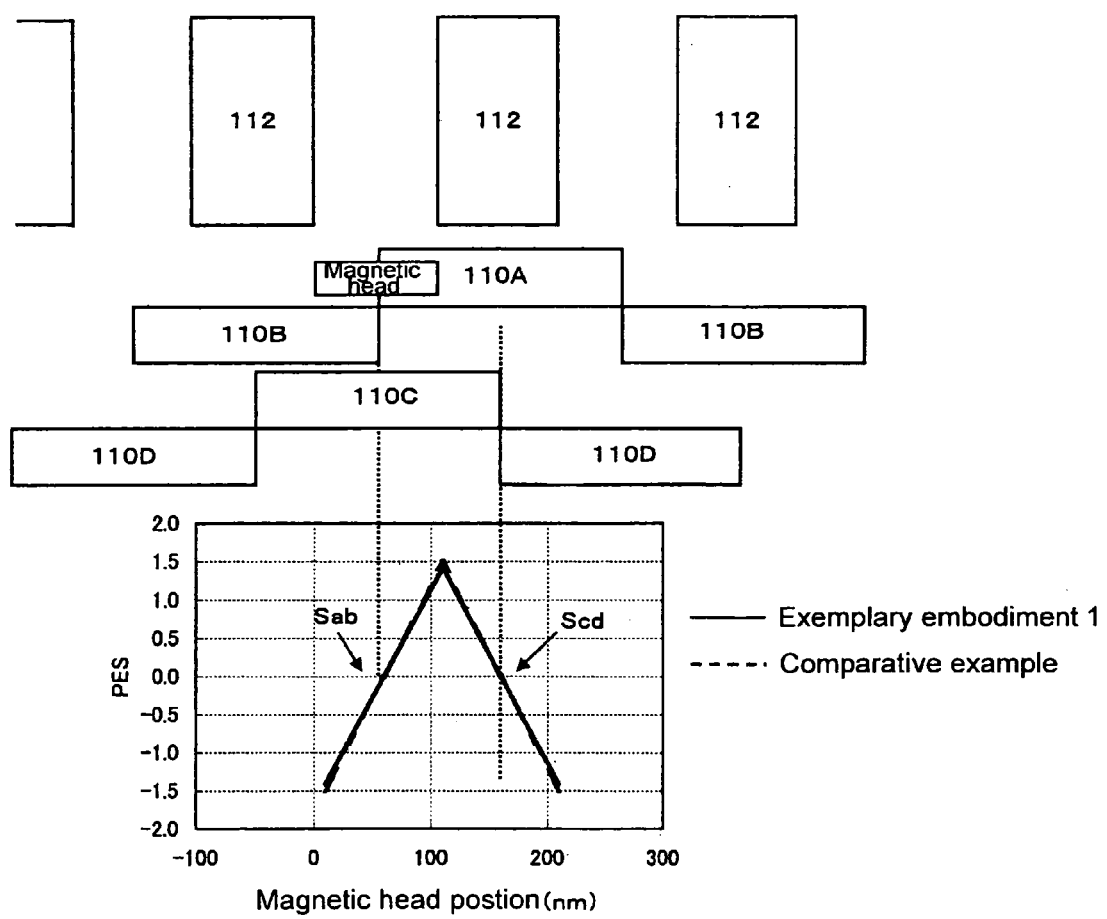
FIG. 9 includes a schematic view showing a positional relationship between data tracks, burst signal groups, and the magnetic head position in the magnetic recording medium of the magnetic recording and reproducing apparatus according to the first exemplary embodiment of the present invention, and a graph showing a relationship between the magnetic head position and a position error signal.

More specifically, as shown in FIG. 9, four burst signal groups 110A, 110B, 110C, and 110D were formed as position information on the magnetic recording medium (one burst signal group was shown with one block in FIG. 9 for convenience). A position error signal Sab obtained from the burst signal groups 110A and 110B and a position error signal Scd obtained from the burst signal groups 110C and 110D both obtained during the movement of the magnetic head were measured. The position error signal Sab is obtained as (Sa−Sb)/(Sa+Sb), where the output of the position control signal of the burst signal group 110A and that of the burst signal group 110B are assumed to be Sa and Sb, respectively. Similarly, the position error signal Scd is obtained as (Sc−Sd)/(Sc+Sd), where the output of the position control signal of the burst signal group 110C and that of the burst signal group 110D are assumed to be Sc and Sd, respectively.

The graph in FIG. 9 shows a relationship between the magnetic head position and the position error signals Sab and Scd in each of the first exemplary embodiment and the conventional example as a comparative example. A line sloping upwards (magnetic head position: 10 nm to 110 nm) in FIG. 9 represents the position error signal Sab and a line sloping downwards (magnetic head position: 110 nm to 210 nm) represents the position error signal Scd.

As shown in FIG. 9, it was confirmed that the position error signal of the magnetic recording and reproducing apparatus of the first exemplary embodiment had linearity that was substantially the same as that of the position error signal of the conventional magnetic recording and reproducing apparatus.

As described above, according to the magnetic recording and reproducing apparatus and the control method for the same of the first exemplary embodiment, it is possible to make the output of the position control signal larger and perform positioning control with high precision, while keeping the linearity of the position error signal.

The inventor of the present invention also measured the number of track-address reading errors per track and a bit error rate of user data per track for 10 tracks by using the magnetic recording and reproducing apparatus of the first exemplary embodiment and the conventional magnetic recording and reproducing apparatus. As for the conventional magnetic recording and reproducing apparatus, the number of the track-address reading errors per track was 0 to 15 (an average number per track was 3.5) and the bit error rate per track was $2.6\times10^{-6}$ to $1.0\times10^{-7}$. On the other hand, as for the magnetic recording and reproducing apparatus of the first exemplary embodiment, the number of the track-address reading errors in all of 10 tracks was zero and the bit error rate per track was not larger than $1.0\times10^{-7}$ in all of 10 tracks.

As described above, according to the first exemplary embodiment of the present invention, the number of the track-address reading errors per track and the bit error rate per track can be reduced, as compared with the conventional magnetic recording and reproducing apparatus. The reasons are considered that the output of the position control signal can be made larger while the linearity of the position error signal is kept, and the noise in the reproducing signal caused by variation in the shape and arrangement of the concavo-convex patterns can be removed.

A magnetic recording and reproducing apparatus and a control method for the same according to the present invention are not limited to those described in the first exemplary embodiment.

Figure 10:
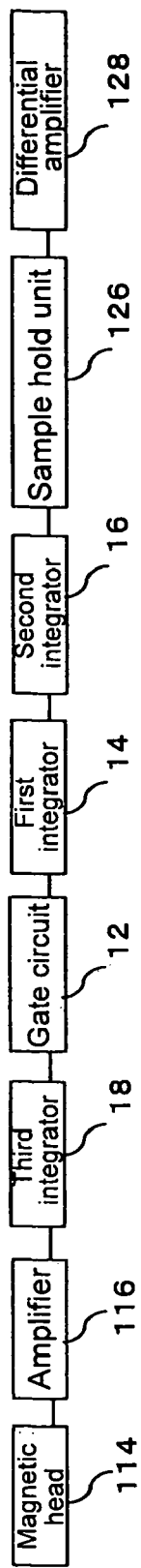
FIG. 10 is a block diagram of a position control circuit of a magnetic recording and reproducing apparatus according to another exemplary embodiment of the present invention.
Figure 11:
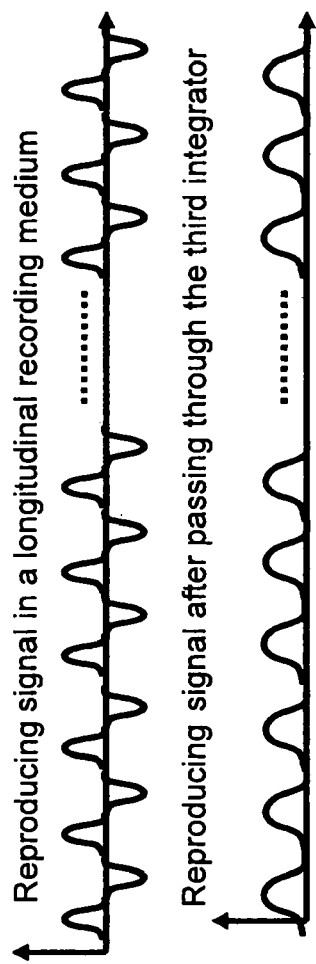
FIG. 11 includes a plan view showing a concavo-convex pattern, a graph showing a reproducing signal of that concavo-convex pattern, and a graph showing the reproducing signal after passing through a third integrator in a magnetic recording medium of the magnetic recording and reproducing apparatus according to the other exemplary embodiment of the present invention.

For example, the magnetic recording medium is not limited to a perpendicular recording medium. The present invention can be also applied to a longitudinal recording medium. In this case, as shown in FIG. 10, it is preferable to arrange a third integrator 18 between the amplifier 116 and the gate circuit 12 in the aforementioned first exemplary embodiment. In this structure, integral of a reproducing signal of a concavo-convex pattern on the longitudinal recording medium is obtained, thereby shaping the reproducing signal to have a similar waveform to that of the reproducing signal of the concavo-convex pattern on the perpendicular recording medium, as shown in FIG. 11.

Figure 12:
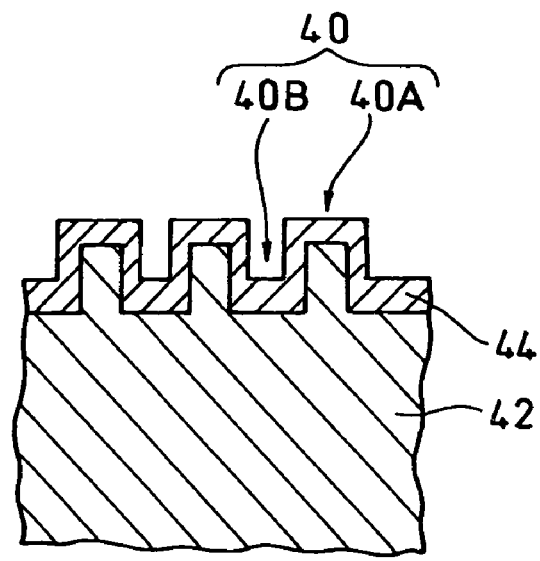
FIG. 12 is a cross-sectional side view schematically showing a second example of the concavo-convex pattern in the servo region on the magnetic recording medium according to the present invention.
Figure 13:
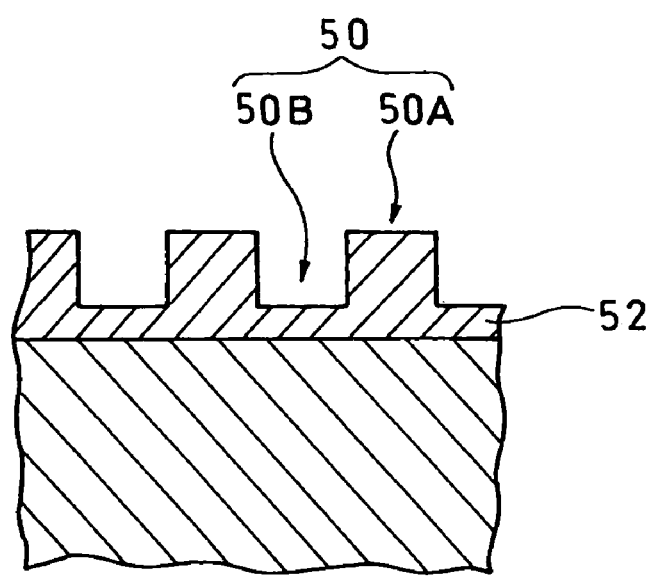
FIG. 13 is a cross-sectional side view schematically showing a third example of the concavo-convex pattern in the servo region on the magnetic recording medium according to the present invention.
Figure 14:
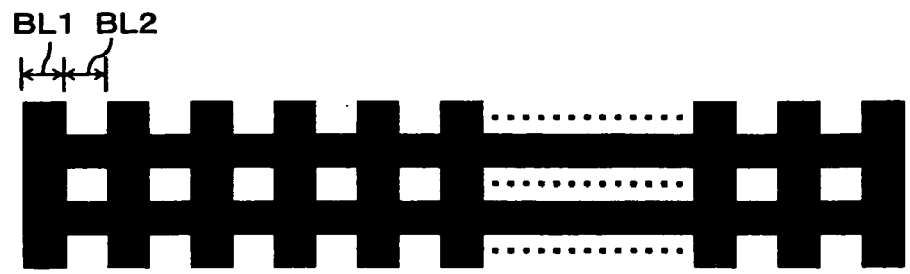
FIG. 14 is a cross-sectional side view schematically showing a fourth example of the concavo-convex pattern in the servo region on the magnetic recording medium according to the present invention.
Figure 15:
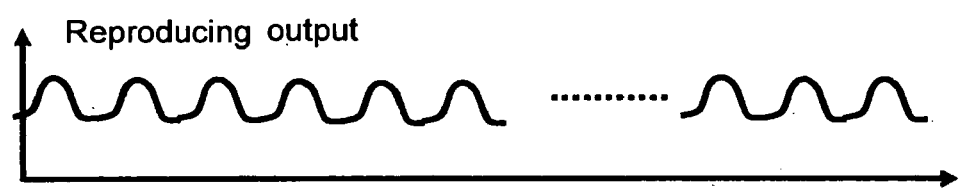
FIG. 15 shows a waveform of the reproducing signal of the concavo-convex pattern in the magnetic recording medium according to the present invention.
Figure 16:
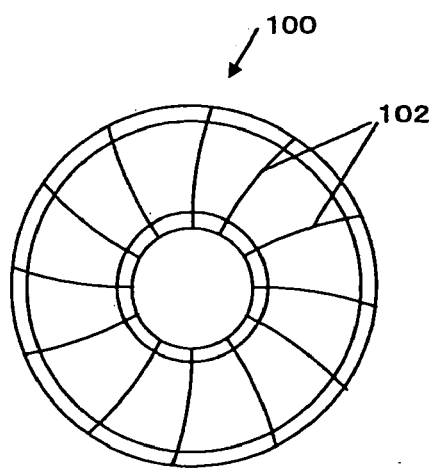
FIG. 16 is a plan view schematically showing a magnetic recording medium of a conventional magnetic recording and reproducing apparatus.
Figure 17:
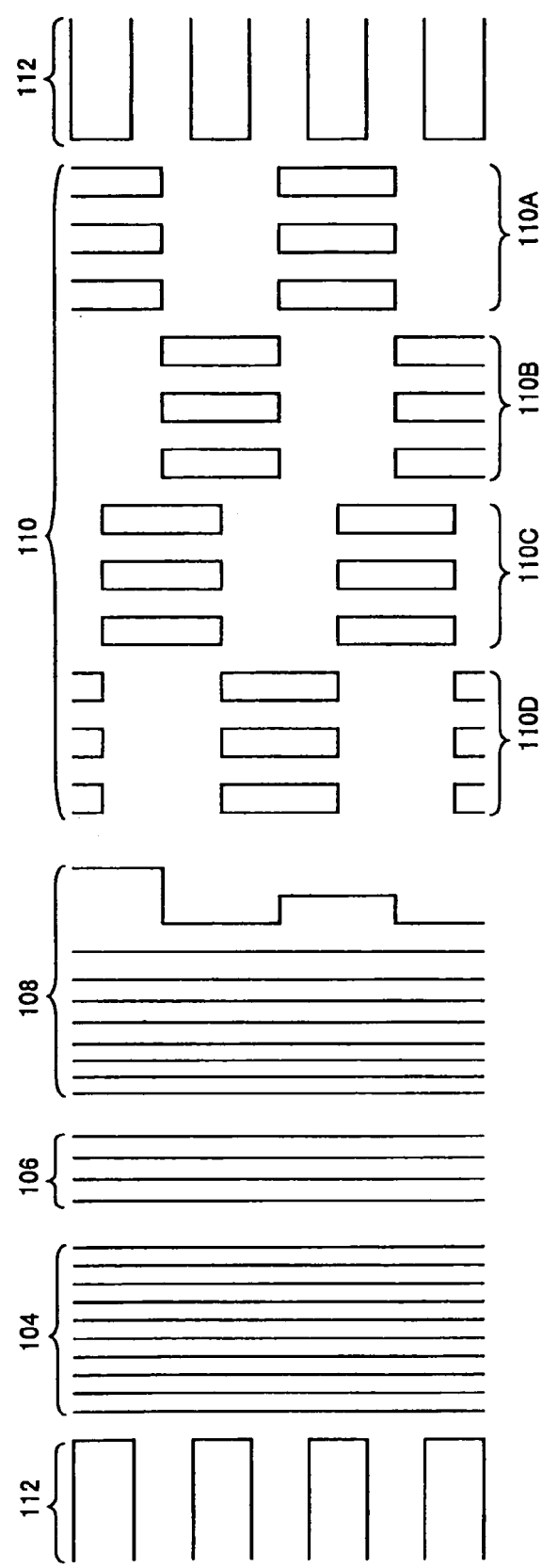
FIG. 17 is an enlarged view schematically showing a portion around a servo region on the magnetic recording medium of the conventional magnetic recording and reproducing apparatus.
Figure 18:
FIG. 18 is an enlarged view schematically showing a burst signal group in the servo region on the magnetic recording medium of the conventional magnetic recording and reproducing apparatus.

The "concavo-convex pattern" in the present invention is not limited to that described in the first exemplary embodiment. For example, as shown in FIG. 12, a concavo-convex pattern 40 may be formed by forming a magnetic layer 44 to cover a concavo-convex pattern formed on a substrate 42. In the concavo-convex pattern 40, the magnetic layer 44 forms not only convex portions 40A but also bottom of concave portions 40B. Alternatively, as shown in FIG. 13, a magnetic layer 52 may form a concavo-convex pattern 50 including not only convex portions 50A but also bottoms of concave portions 50B. Moreover, the convex portions shown in FIG. 3 (black portions in FIG. 3) may be changed into concave portions of the concavo-convex pattern (white portions in FIG. 14). In this case, a baseline of the output of the reproducing signal of the concavo-convex pattern goes up wholly, as shown in FIG. 15, because the concave portions in the arrangement of FIG. 3 are changed into convex portions formed by a magnetic layer. However, when an end of a signal corresponding to the concave portion is removed by means of the extraction devices of the present invention so as to extract a part of a reproducing signal of the concavo-convex pattern, the same effects as those described in the first exemplary embodiment can be achieved.

In the first exemplary embodiment, the present invention is applied to a discrete track medium having a user data region in which concentric recording tracks are formed by convex portions formed by a magnetic layer and are magnetically separated from each other by a plurality of concentric grooves (i.e., concave portions of a concavo-convex pattern). However, the present invention is not limited thereto.

For example, the present invention can be applied to a so-called patterned medium in which convex portions formed by sectioning a magnetic layer in a mesh-like pattern or a dot pattern (i.e., dividing each recording track into a plurality of parts in the circumferential direction in such a manner that those parts are magnetically separated from each other) are isolated from each other like islands. Moreover, the magnetic layer of the user data region may be formed by a continuous magnetic layer in which no concavo-convex pattern is formed.

In the first exemplary embodiment, the burst pattern formed by four burst signal groups 110A, 110B, 110C, and 110D is formed as position information on the magnetic recording medium. However, the present invention is not limited thereto. For example, a burst pattern may be formed to include a pair of burst signal groups 110A and 110B only. In addition, the arrangement of the burst signal groups with respect to the data tracks is not limited specifically. For example, a pair of position information, i.e., the burst signal groups 110A and 110B may be arranged at positions shifted from positions of another pair of position information, i.e., the burst signal groups 110C and 110D by one third of the track pitch.

The present invention can be applied to a magnetic recording and reproducing apparatus including a magnetic recording medium such as a discrete track medium and a patterned medium.

What is claimed is:

1. A magnetic recording and reproducing apparatus comprising:
   a magnetic recording medium onto which servo information including position information is recorded by a plurality of concavo-convex patterns formed by a magnetic layer;
   extraction devices for extracting a part of a reproducing signal of the concavo-convex patterns by removing a signal corresponding to an end of a concave portion or an end of a convex portion of the concavo-convex patterns from the reproducing signal;
   integral devices for obtaining area integral of an extracted reproducing signal; and
   signal addition devices for adding respective signals after area integral is obtained to each other to generate a position control signal for controlling a position of a magnetic head.

2. The magnetic recording and reproducing apparatus according to claim 1, wherein
   the extraction devices generates a gate pulse signal having a pulse width smaller than a pulse width of a signal corresponding to the concave portion or the convex portion, and extracts the part of the reproducing signal by using the gate pulse signal.

3. A control method for a magnetic recording and reproducing apparatus, comprising:
   extracting a part of a reproducing signal of concavo-convex patterns that form position information recorded on a magnetic recording medium by removing a signal corresponding to an end of a concave portion or an end of a convex portion of the concavo-convex patterns from the reproducing signal, the concavo-convex patterns being formed by a magnetic layer;
   obtaining area integral of an extracted reproducing signal;
   adding respective signals after area integral is obtained to each other to generate a position control signal; and
   performing positioning control for a magnetic head based on the position control signal.

4. The control method according to claim 3, further comprising:
   generating a gate pulse signal having a pulse width smaller than a pulse width of a signal corresponding to the concave portion or the convex portion; and
   extracting the part of the reproducing signal by using the gate pulse signal.

* * * * *